W. LOYD.
Stereoscope.
No. 23,257.
Patented March 15, 1859.
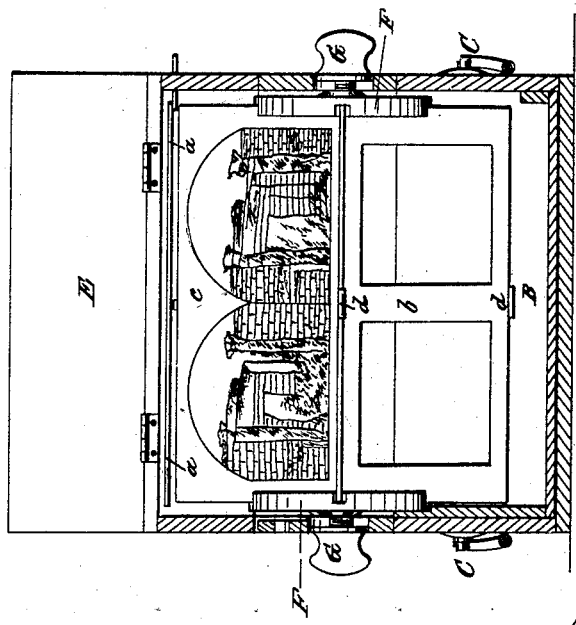
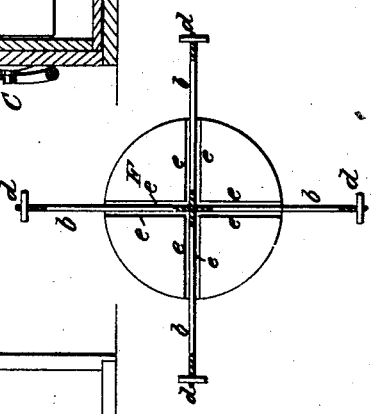
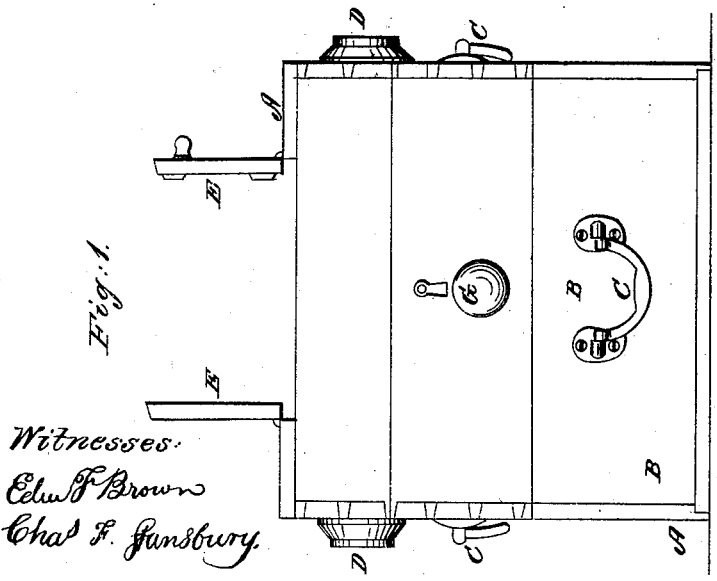
Witnesses
Edw. F. Brown
Chas F. Gunsbury
Inventor
William Loyd

UNITED STATES PATENT OFFICE.

WILLIAM LOYD, OF PHILADELPHIA, PENNSYLVANIA.

STEREOSCOPE.

Specification of Letters Patent No. 23,257, dated March 15, 1859.

*To all whom it may concern:*

Be it known that I, WILLIAM LOYD, of Philadelphia, in the State of Pennsylvania, have invented an Improved Instrument for Viewing Stereoscopic Pictures; and I do hereby declare that the following is a correct description of the same, reference being had to the accompanying drawings, in which—

Figure 1 is a side elevation of the instrument. Fig. 2 is a central vertical section of the same at right angles to Fig. 1, and Fig. 3 is a separate view of the picture holder.

The same letter marks the same part in all the figures.

The nature of my invention consists in the peculiar construction hereinafter described of a box or instrument for the inspection of stereoscopic pictures, whereby two opaque pictures can be viewed by reflected light at the same time by persons on opposite sides of the instrument, and yet the instrument be capable of exhibiting transparent pictures by transmitted light when desired.

A marks the frame of the box; B a drawer for the reception of slides; C handles; D, eye glasses; E, reflectors; F grooved heads of the picture holder; G, knobs by means of which the picture holder is revolved; $a$, plate of ground glass; $b$ frame of picture holder; $c$, picture; $d$ spring buttons for holding pictures in place; $e$, grooves in which the ends of the pictures are held.

The box may be made in any suitable form, and have a drawer, B, in the lower part of it to receive the pictures. The box is lifted and carried by means of handles C. The picture holder is formed by uniting four frames $b$, at right angles to each other, to the circular heads F. These heads turn on journals in the sides of the box, and they are revolved by means of knobs G, G. The pictures to be viewed are slipped into the grooves $e\ e$, and secured in place by the buttons $d$, which may be made with a spring which shall cause them, when at right angles to frame $b$, to turn down at the ends and hold the picture against the frame. Two opaque pictures may be placed in each arm of the picture holder, back to back, and may be viewed, each by a separate observer, at the same time. The reflected light required to illuminate the opaque pictures is thrown down upon them by the reflectors E which may be placed at any required angle. If a transparent or translucent picture is to be viewed, the ground glass $a$ is placed in front of the lenses on one side of the box, to diffuse the light transmitted through them, and the observer makes use of the eye glasses on the opposite side of the box. In this case, but one picture can be shown at a time, and to but one observer. The reflectors E are closed when translucent pictures are being viewed.

Having thus fully described my invention, what I claim and desire to secure by Letters Patent is—

1. A stereoscopic instrument having eye glasses at opposite sides and double reflectors in combination with a revolving picture holder arranged substantially as described.

2. I also claim the grooves $e$, $e$, on opposite sides of the frames $b$ for the purpose of holding two pictures in contact with each frame as specified.

The above specification signed and witnessed this 31st day of January A. D. 1859.

WILLIAM LOYD.

Witnesses:
EDW. F. BROWN,
CHAS. F. STANSBURY.